United States Patent
Sunwoo

(10) Patent No.: US 6,266,095 B1
(45) Date of Patent: Jul. 24, 2001

(54) APPARATUS AND METHOD FOR CONTROLLING SCALER MEMORY OF VIDEO SIGNAL PROCESSING SYSTEM

(75) Inventor: Jun Sunwoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/181,132

(22) Filed: Oct. 28, 1998

(30) Foreign Application Priority Data

Nov. 11, 1997 (KR) .................................. 97-59283

(51) Int. Cl.$^7$ ...................................... H04N 7/08

(52) U.S. Cl. .......................... 348/473; 348/476; 348/478; 348/581; 348/556

(58) Field of Search ..................... 348/473, 476, 348/477, 478, 479, 464, 467, 468, 581, 568, 445, 556, 520, 408.1; 375/317, 318

(56) References Cited

U.S. PATENT DOCUMENTS

| | | | |
|---|---|---|---|
| 4,709,394 | * | 11/1987 | Bessler et al. ................ 348/408.1 |
| 5,225,875 | * | 7/1993 | Shapiro et al. .................. 348/571 |
| 5,638,467 | * | 6/1997 | Chua et al. ...................... 348/441 |
| 5,786,866 | * | 7/1998 | Sani et al. ....................... 348/520 |
| 5,907,366 | * | 5/1999 | Farmer et al. ................... 348/478 |
| 6,118,828 | * | 9/2000 | Schleifer ......................... 375/317 |

* cited by examiner

Primary Examiner—Reinhard J. Eisenzopf
Assistant Examiner—Trang U. Tran
(74) Attorney, Agent, or Firm—F. Chau & Associates LLP

(57) ABSTRACT

A video signal processing system including a scaler and a VBI decoder is provided. The video signal processing system includes a control signal generator for generating a mode select signal for selecting one of a normal mode for reading or writing the active video data from or to the memory, and a VBI mode for reading or writing the VBI data from or to the memory. A control signal is also generated for enabling data to be read or written from or to the memory in each of the modes. A multiplexer multiplexes active video data and VBI data in accordance with the mode select signal. There is also provided write control means for receiving the signal output from the multiplexer, and if the memory write is enabled by the control signal generator, for scaling the active video data by a predetermined ratio during an active video interval to write the scaled active video data to the memory, or writing the VBI data to the memory during a vertical blanking interval (VBI), and read control means for reading scaled active video data from the memory by a FIFO method during the active video interval, or reading the VBI data from the memory by a FIFO method during the VBI, and outputting the read data, if the memory read is enabled by the control signal generator. Thus, active video data and vertical blanking data can be processed in an active interval and a vertical blanking interval, respectively, by a time-division method using the scaler memory.

14 Claims, 10 Drawing Sheets

APPARATUS AND METHOD FOR CONTROLLING SCALER MEMORY OF VIDEO SIGNAL PROCESSING SYSTEM

BACKGROUND OF THE INVENTION

1. Field of the Invention

The present invention relates to a video signal processing system including a scaler and a vertical blanking interval (VBI) decoder, and more particularly, to a controller for effectively processing scaler data and VBI data using a scaler memory.

2. Description of the Related Art

FIG. 1 is a block diagram of a typical scaler for scaling video signals by a predetermined ratio. First and second line memory units 10 and 12, each of which has two line memories, receive luminance data Y and chrominance data C to delay at most two lines. A vertical scaler 14 receives luminance data Y, YD and YDD output by the first line memory unit 10 and chrominance data C, CD and CDD output by the second line memory unit 12, and then vertically scales the received data and performs filtering for extracting effective lines and improving the screen quality. A horizontal scaler 16 receives luminance data YZ and chrominance data CZ output by the vertical scaler 14, and then horizontally scales the received data to output scaled data YOUT and COUT.

Meanwhile, in a video signal processing system, there are many devices such as a VBI decoder which allows predetermined data to be output during vertical blanking interval (VBI). The VBI decoder outputs serially VBI data such as closed caption data, teletext data and SMPTE time code data etc, through another external pin during VBI. Thus, the additional external pin is required to output and process the VBI data.

A need therefore exists for a scaler memory controller of a video signal processing system including a scaler and VBI decoder, in which active video data is processed in an active interval and vertical blanking data is processed in a vertical blanking interval (VBI), using a scaler memory.

There also exists a need to provide a scaler memory controller of a video signal processing system including a scaler and a VBI decoder, in which active video data and vertical blanking data are time-division read or written from or to the scaler memory.

A further need exists to provide a method for controlling a scaler memory for processing active video data and vertical blanking data using a scaler memory, in a video signal processing system including a scaler and a VBI decoder.

SUMMARY OF THE INVENTION

There is provided a scaler memory controller of a video signal processing system including a scaler having a memory, preferably operating by a first-in first-out (FIFO) method, for receiving active video data to output data scaled by a predetermined ratio through the memory, and a VBI decoder for processing VBI data received during a vertical blanking interval (VBI), comprising: a control signal generator for generating a mode select signal for setting one selected from the group consisting of a normal mode, for reading or writing the active video data from or to the memory, and a VBI mode, for reading or writing the VBI data from or to the memory, and generating a control signal for enabling data to be read or written from or to the memory in each of the modes; a first multiplexer for receiving the active video data and the VBI data, to select one in accordance with the mode select signal and output the selected signal; write control means for receiving the signal output from the first multiplexer, and if the memory write is enabled by the control signal generator, for scaling the active video data by a predetermined ratio during an active video interval to write the scaled active video data to the memory, or writing the VBI data to the memory during a vertical blanking interval (VBI); read control means for reading scaled active video data from the memory by a FIFO method during the active video interval, or reading the VBI data from the memory by a FIFO method during the VBI, and outputting the read data, if the memory read is enabled by the control signal generator.

There is also provided a scaler memory controller of a video signal processing system including a scaler having a memory, preferably operating by a first-in first-out (FIFO) method, for receiving active video data to output data scaled by a predetermined ratio through the memory, and a VBI decoder for processing VBI data received during a vertical blanking interval (VBI), comprising: mode setting means for setting one selected from the group consisting of a normal mode, for reading or writing the active video data from or to the memory, and a VBI mode, for reading or writing the VBI data from or to the memory; a write address generator for generating an address for scaling the active video data during an active video interval by a predetermined ratio to sequentially write the scaled data to the memory, or an address for sequentially writing the VBI data during the VBI to the memory, in accordance with the set mode; and a read address generator generating an address for FIFO, reading the scaled data during the active video interval, or the VBI data during the VBI, from the memory, in accordance with the set mode.

There is further provided a method for controlling a scaler memory of a video signal processing system including a scaler having a memory, preferably operating by a first-in first-out (FIFO) method, for receiving active video data to output data scaled by a predetermined ratio through the memory, and a VBI decoder for processing the VBI data received during a vertical blanking interval (VBI), for processing the active video data and the VBI data through the memory of the scaler, comprising the steps of: during an active video signal interval, scaling the active video data by a predetermined ratio to write the scaled data in the memory, comparing the total number of pixels with the number of effective pixels during the write process to determine a timing point of beginning to read data, and FIFO reading data at the determined read timing point from the memory; and during the VBI, FIFO reading VBI data written during a previous VBI from the memory and writing VBI data to be read during a next VBI to the memory.

BRIEF DESCRIPTION OF THE DRAWINGS

The above objectives and advantages of the present invention will become more apparent by describing in detail a preferred embodiment thereof with reference to the attached drawings in which.

DESCRIPTION OF PREFERRED EMBODIMENTS

The present invention provides a scaler which includes a first-in first-out (FIFO) memory. The FIFO memory facilitates real-time processing of video data. For example, the FIFO memory can store input data and at the same time output data which has been previously stored, so that data is input to a write port, and at the same time data is output from a read port. When the data write and read operations are effectively controlled, the size of the FIFO memory can be minimized.

Figure 1:
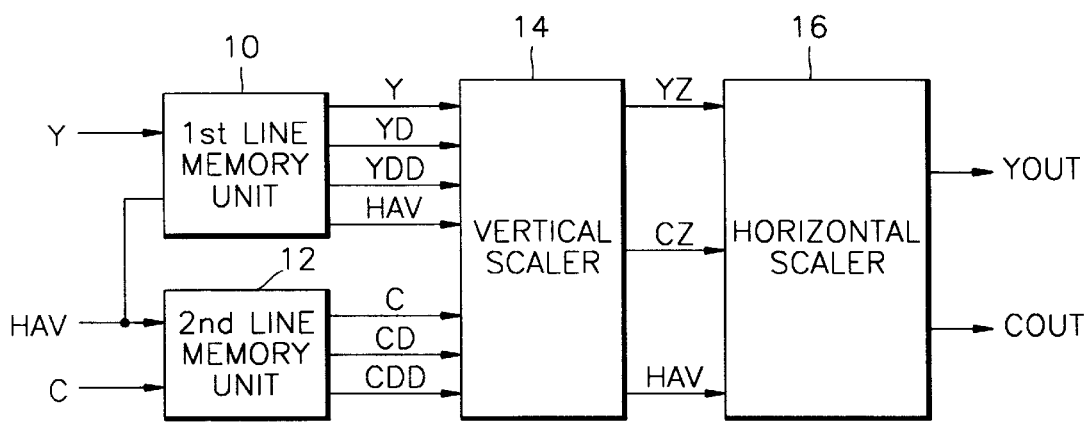
FIG. 1 is a block diagram of a conventional for scaling video data.
Figure 2:
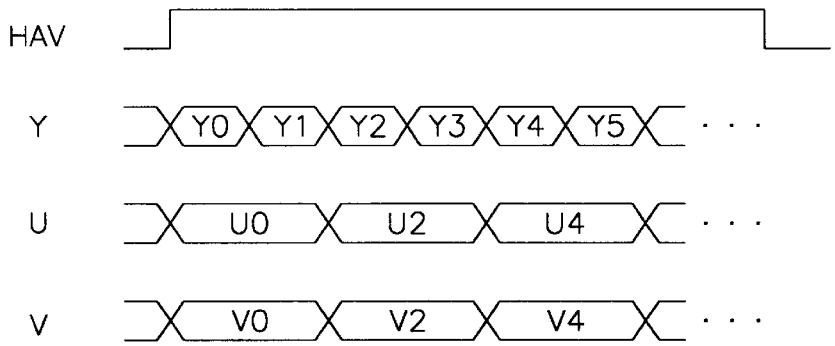
FIG. 2 is a timing diagram showing the timing relationship of luminance and chrominance data.
Figure 3:
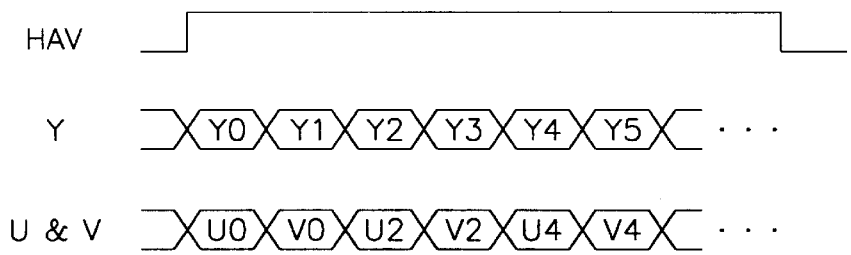
FIG. 3 is a timing diagram showing data obtained by time-division multiplexing the luminance data and the chrominance data of FIG. 2.

In a 4:2:2 format of CCIR601 as shown in FIG. 2, luminance data Y changes twice for each change in chrominance data (U, V). The chrominance data (U, V) is changed at a transition point of the luminance data Y, which is changed every clock cycle, to thereby transmit all of the luminance data Y and the chrominance data (U, V) of the 4:2:2 format as shown in FIG. 3.

Figure 4:
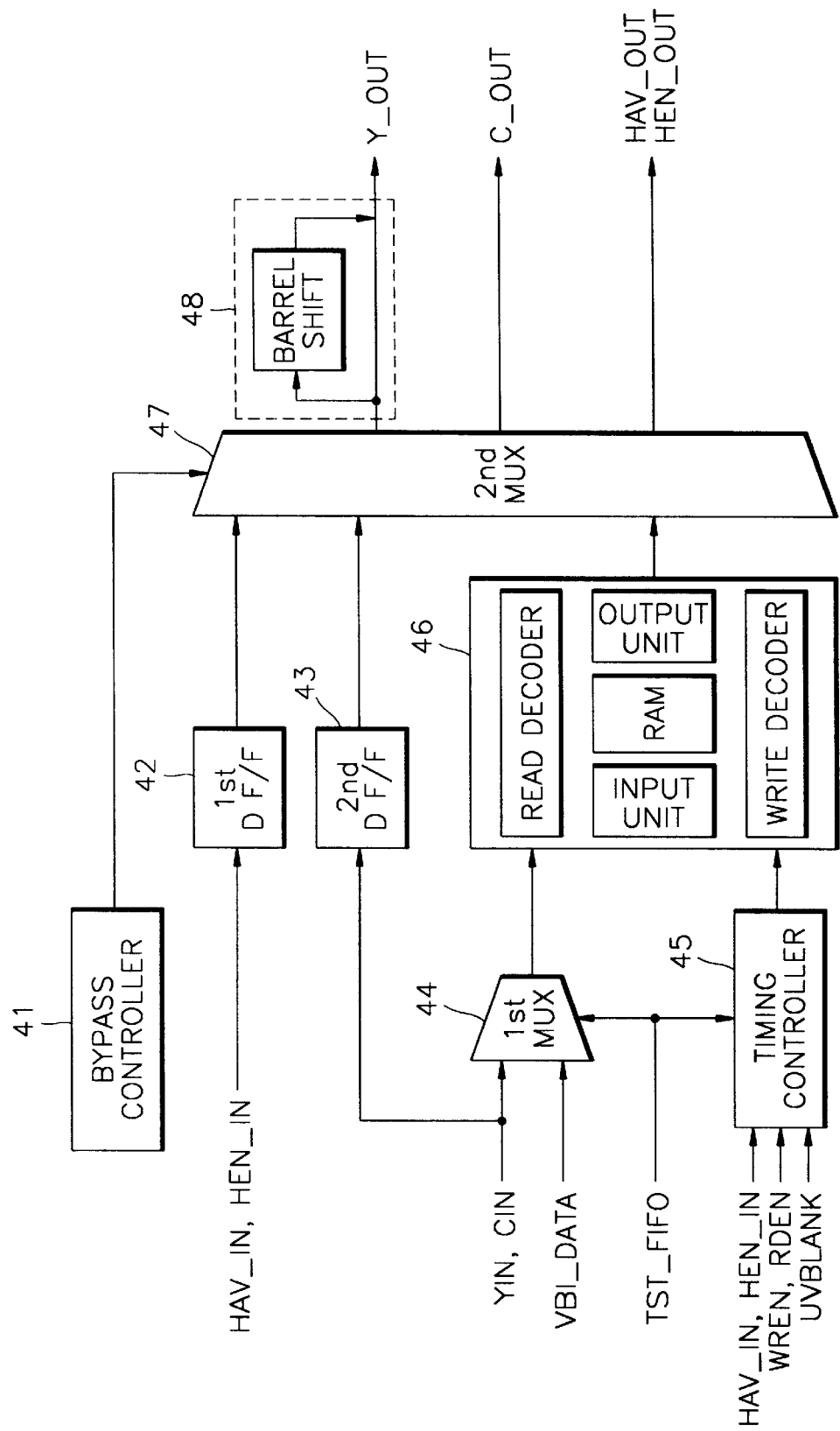
FIG. 4 is a block diagram of an apparatus for controlling a scaler memory in a video signal processing system according to the present invention.

FIG. 4 shows a block diagram of an illustrative embodiment of the video signal processing system according to the present invention. The illustrative system comprises a scaler including a memory, which preferably operates in a first-in-first-out (FIFO) method. The memory receives active video data and output data scaled at a predetermined ratio through the memory. The system also includes a VBI decoder which processes VBI data received during the VBI. In the present invention, the active video data and the VBI data are processed simultaneously using the memory in the scaler.

Input and output signals will be described as follows. A TST_FIFO signal is a control signal for selecting a normal mode of reading/writing active video data from/to a memory or a VBI mode of reading/writing VBI data from/to the memory, is input to a first multiplexer 44 and a timing controller 45. YIN and CIN signals are data processed in the active video interval. YIN and CIN indicate luminance data and chrominance data, respectively. A VBI_DATA signal is data processed in the VBI.

A HAV_IN signal enables data to be input to the memory. When HAV_IN is high, a signal output from the first multiplexer 44 can be written to the memory. A HEN_IN signal, which enables active video data to be written in the memory in the active video interval, enables memory write in a predetermined period such that the active video data is scaled at a predetermined ratio. A WREN signal is for enabling the VBI data to be written to the memory in the VBI. A RDEN signal is for enabling the VBI data to be read from the memory. A UVBLANK signal is for distinguishing the active video interval from the VBI. That the UVBLANK is high indicates a VBI.

The timing controller 45 receives the TST_FIFO signal, the HAV_IN signal, the HEN_IN signal, the WREN signal, the RDEN signal, and the UVBLANK signal. The timing controller 45 controls a memory unit 46 in accordance with received control signals, and generates a HEN_OUT signal for enabling the memory to read data written in the memory unit 46.

The first multiplexer 44 receives active video data YIN and CIN and vertical blanking data VBI_DATA, and selects one signal in accordance with selection of the TST_FIFO signal to output the selected signal. That is, the active video data in the normal mode or the vertical blanking data in the VBI mode, is output to the memory unit 46.

The bypass controller 41 sets a bypass mode for directly outputting the active video data without passing through the memory unit 46, and controls the output of a second multiplexer 47. That is, when the bypass mode is set by the bypass controller 41, the second multiplexer 47 selects one of output signals of first and second D flipflops 42, 43 and not the output from the memory unit 46.

The active video data YIN and CIN is input to a second D flipflop 43 and then output to the second multiplexer 47, and HAV_IN and HEN_IN signals are input to the first D-flipflop 42 and then output to the second multiplexer 47. The output signals of the first and second D-flipflops 42 and 43 are selected by the second multiplexer 47 in the bypass mode.

The memory unit 46 includes a RAM, preferably one operated by a FIFO method, an input unit for receiving data to be written to the RAM, an output unit for outputting data read from the RAM, a write decoder for generating an address for writing the data received by the input unit to the RAM, and a read decoder for generating an address for reading data from the RAM to output the read data to the output unit. That is, in accordance with the address generated by the write decoder, if the HEN_IN signal is high in the active video interval, the input unit sequentially writes input active video data in the RAM, and if the WREN signal is high in the vertical blanking interval, the input unit sequentially writes VBI data to the RAM. Also, in accordance with the address generated by the read decoder, the output unit FIFO-reads data from the RAM and outputs the read data in a FIFO manner while the HEN_OUT signal is high.

The second multiplexer 47 selects signals output from the first and second D-flipflops 42 and 43 in the bypass mode, and signals output from the memory unit 46 in the normal mode or the VBI mode. A barrel shift 48 receives a closed caption enable (CCEN) signal indicating whether VBI data is effective, and outputs the VBI data output from the second multiplexer 47 in the VBI mode while the CCEN signal is enabled. That is, when the VBI data is the closed caption data of which only the MSB is effective data, only the most significant 4 bits of the output from the second multiplexer 47 are received by the barrel shift 48, and thus output data in a desired format can be generated.

Figure 5:
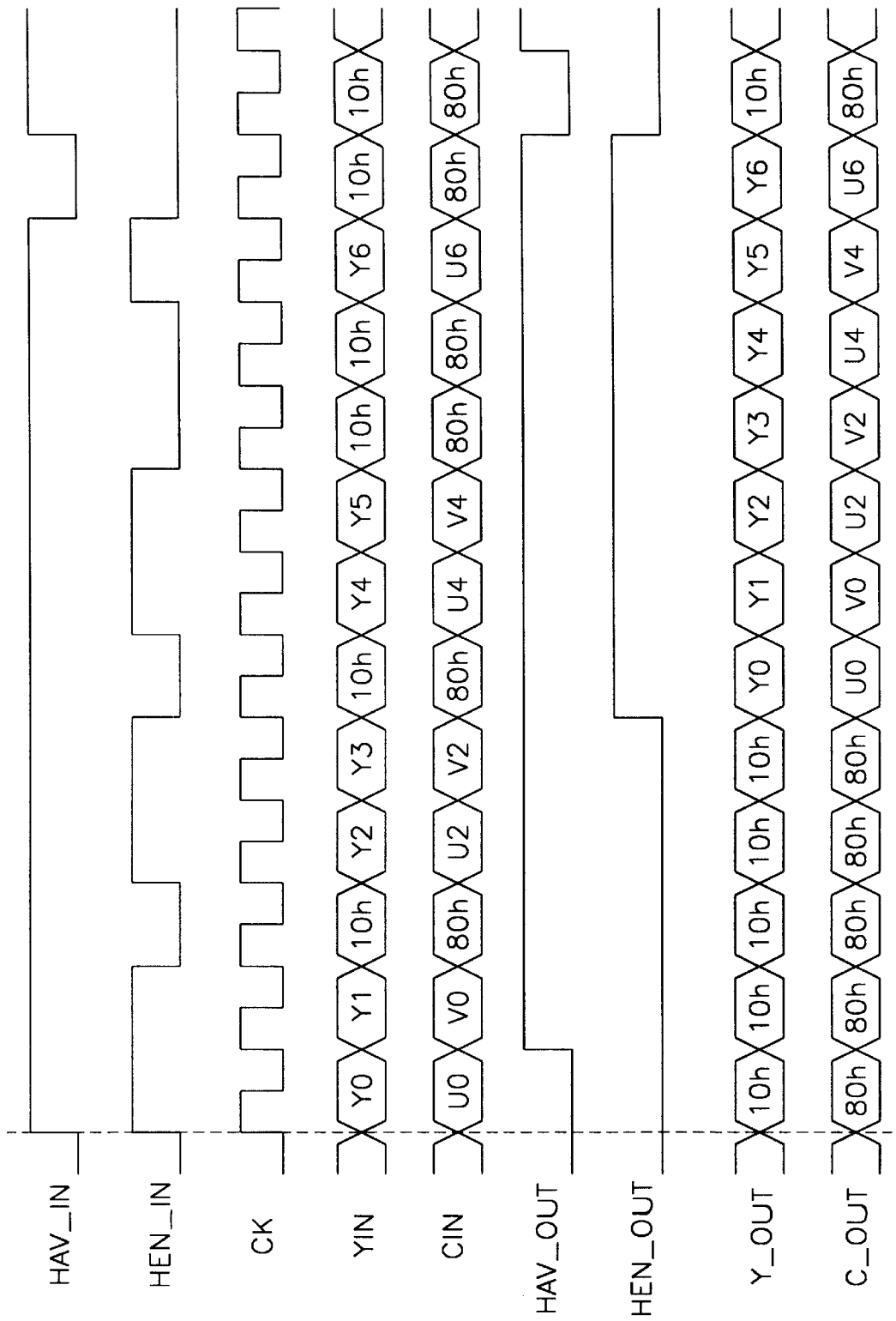
FIGS. 5 through 7 are timing diagrams showing operation of the apparatus of FIG. 4.
Figure 6:
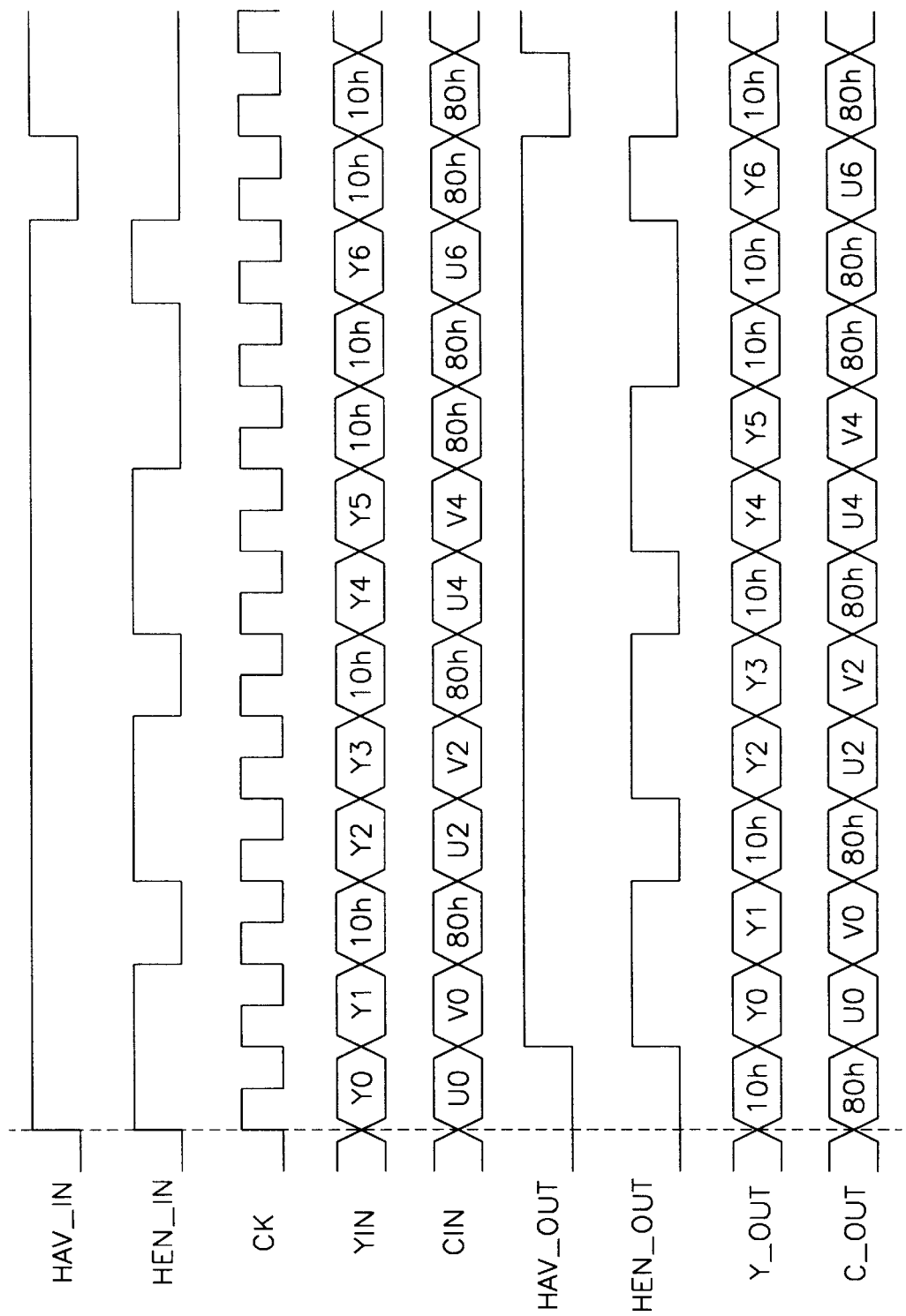
Figure 7:
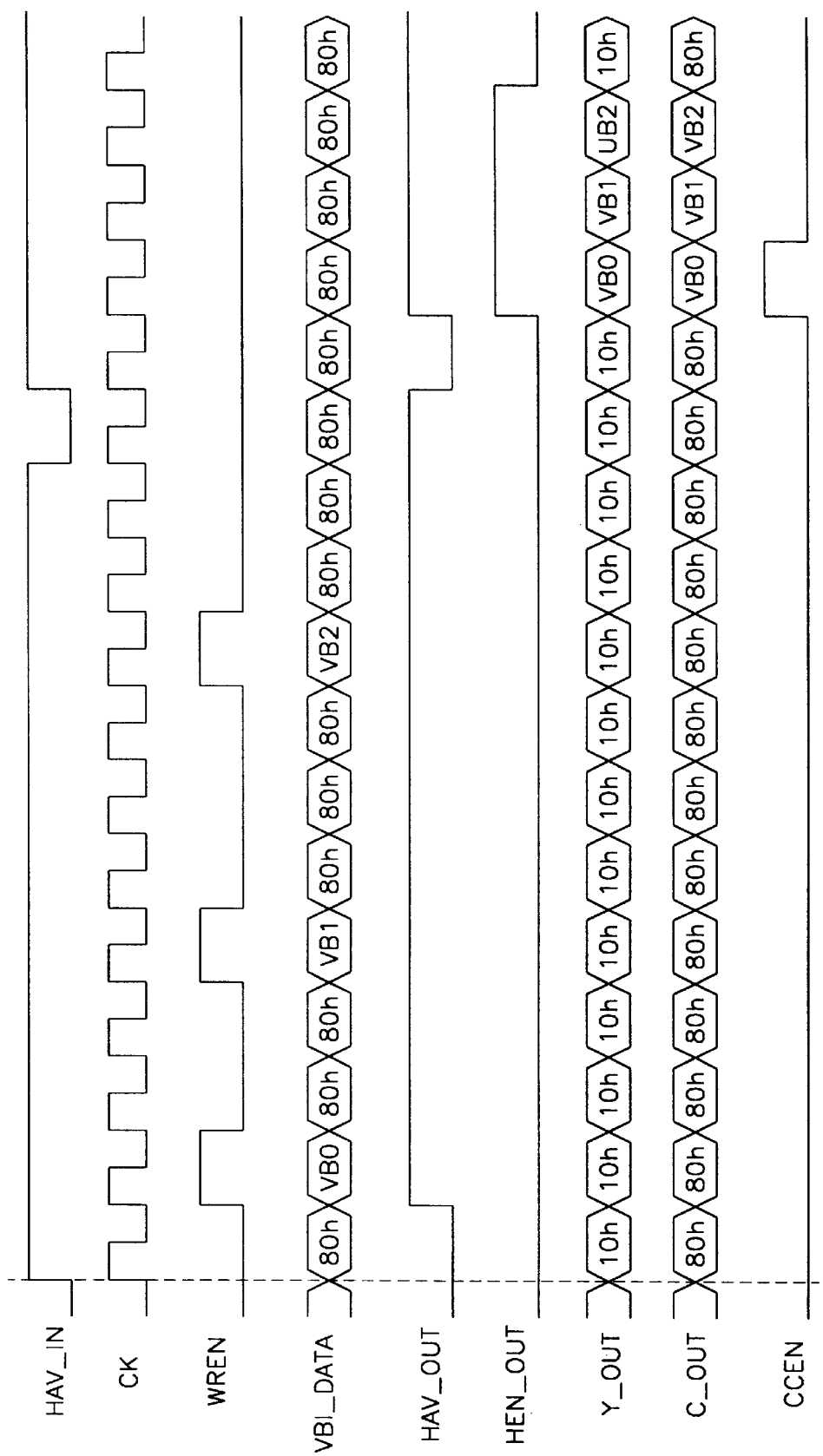

According to the illustrative embodiment of the present invention, the apparatus operates in three modes: (1) normal mode, (2) bypass mode and (3) VBI mode. FIGS. 5 through 7 are timing diagrams showing the timing relationship and operation in each mode of the apparatus of FIG. 4. FIG. 5 shows operation in the normal mode, FIG. 6 shows operation in the bypass mode and FIG. 7 shows operation in the VBI mode. Here, data 10h and 80h represent "don't care" data whose value is not critical.

Referring to FIGS. 4 and 5, in the normal mode, signals YIN and CIN are received by the memory unit 46 through the first multiplexer 44, and only data of an interval in which the signal HEN_IN is logic high is effectively written to the memory unit 46 to be horizontally scaled. Y_OUT and C_OUT are output through the second multiplexer 47 such that the horizontally scaled data stored in the memory unit 46 are displayed on the right of the video line in accordance with HAV_OUT and HEN_OUT signals. At this time, effective video data is output only in an interval in which the signal HEN_OUT is logic high.

Referring to FIGS. 4 and 6, the bypass mode is used for the cases in which a special function such as a test of the FIFO block is performed. The scaled data is displayed using a certain method other than displaying on the right of the video line, or the normal video data is output during the VBI without scaling, like when an enlarged image is intended to be displayed. In this mode, data is not output from the memory unit 46 but the YIN and CIN signals are directly output through the second D-flipflop 43 and the second multiplexer 47. Also, the control signals HAV_IN and HEN_IN are directly output through the first D-flipflop 42 and the second multiplexer 47.

Referring to FIGS. 4 and 7, in the VBI mode, input data VBI_DATA is output through the first multiplexer 44 in accordance with control of the signal TST_FIFO, and the data is written to the memory unit 46 while the signal WREN is logic high. At this time, the signal WREN is generated in the VBI mode, regardless of the signal HEN. After the VBI data is written, the data begins to be read from the next rising edge of the signal HAV_OUT, and the previously written VBI data is output to terminals Y_OUT and C_OUT through the second multiplexer 47 while the signal HEN_OUT is high. The signal CCEN becomes logic high in an interval in which the vertical blanking data is effective. As can be readily understood by one ordinarily skilled in the art, the Y_out and C_out data are output whenever both HAV_OUT and HEN-OUT are high. HAV_OUT and HEN_OUT are output from a control signal generator depending upon whether the mode of operation is in normal, bypass, or VBI mode as shown in FIGS. 5, 6 and 7.

Figure 8:
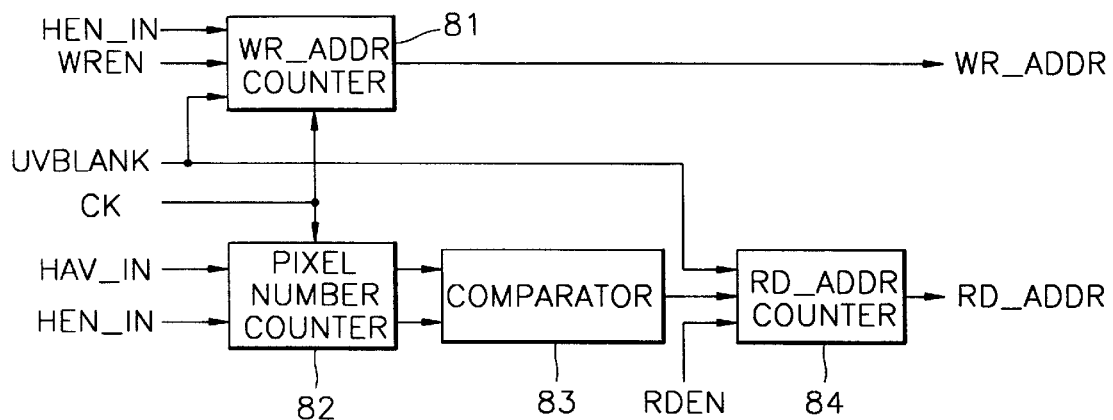
FIG. 8 is a block diagram of a scaler memory controller according to the present invention.

FIG. 8 is a block diagram showing a scaler memory controller according to the present invention, i.e., the structure of an embodiment of the read/write decoder of FIG. 4. The decoder includes a write address generator having a write address counter 81, and a read address generator including a pixel number counter 82, a comparator 83 and a read address counter 84.

The signal UVBLANK of logic high denotes a vertical blanking interval, and the signal UVBLANK of logic low denotes an active video interval. Thus, the signal UVBLANK sets either a normal mode in which active video data is read or written from or to the memory, or a VBI mode in which VBI data is read or written from or to the memory. An operational mode of the write address counter 81 or the read address counter 84 is set in accordance with the signal UVBLANK.

The write address counter 81 receives the signals HEN_IN and WREN, and generates an address WR_ADDR for sequentially writing the active video data or the VBI data to the memory, in accordance with the mode set by the signal UVBLANK. That is, the write address counter 81 generates an address for scaling the active video data by a predetermined ratio to sequentially write the scaled data to the memory in the active signal interval of the normal mode, or an address for sequentially writing the VBI data to the memory in the vertical blanking interval of the VBI mode. The detailed structure of the write address generator will be described later with reference to FIG. 9.

The read address generator generates an address for sequentially reading scaled data in the active signal interval and VBI data in the vertical blanking interval, from the memory, in accordance with a set mode. Here, the pixel number counter 82 receives signals HAV_IN and HEN_IN, and counts the total number of input pixels and the number of effective pixels of scaled effective data during one active signal interval. The comparator 83 compares the total number of pixels with the number of effective pixels and determines a time point to begin reading the scaled data from the memory. The read address counter 84 counts the number of effective pixels of the scaled data from the read point in the normal mode, or the number of pixels of the VBI data in a VBI mode and while RDEN signal is enabled. The detailed structure of the read address generator will be described later with reference to FIG. 12.

Figure 9:
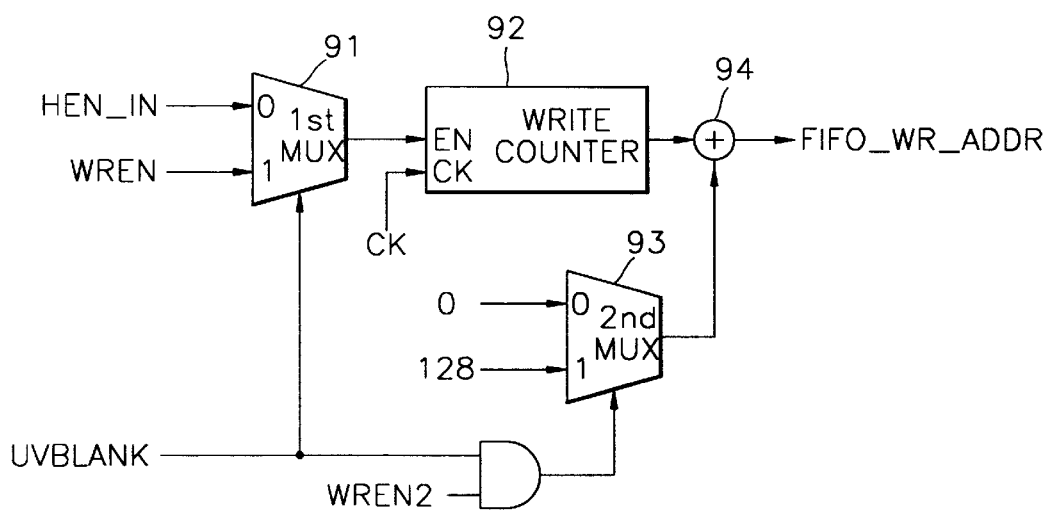
FIG. 9 is a block diagram of a write address generator.

FIG. 9 is a block diagram of the structure of the write address generator of FIG. 8.

The first multiplexer 91 selects the signal HEN_IN or WREN in accordance with the signal UVBLANK. That is, when the signal UVBLANK is logic low (normal mode), the signal HEN_IN is selected, and when logic high (VBI mode), the signal WREN is selected. The write counter 92 counts up, triggered by a clock signal CK, while an output signal of the first multiplexer 91, input to an EN terminal, is logic high. The second multiplexer 93 selects 0 or 128 in accordance with the signals UVBLANK and WREN2. That is, when the signal UVBLANK is logic low (normal mode), 0 is selected. Meanwhile, when the signal UVBLANK is logic high (VBI mode), if the signal WREN2 is also logic high, 128 is selected, and otherwise 0 is selected. Here, the signal WREN2 is a write enable signal used for the write control for a special purpose. Accordingly, if the signal WREN2 is logic high, data of a normal mode or a VBI mode can be written to the memory at a predetermined offset interval (128). An adder 94 adds the count value of the counter 92 to the output of the second multiplexer 93, to generate a write address FIFO_WR_ADDR. That is, the adder 94 outputs an address at FIFO_WR_ADDR a value counted by the write counter 92 in the normal mode, and a value obtained by adding a predetermined offset value (128) to the value counted by the write counter 92, in the VBI mode.

The write address generator operates in each operational mode as follows. If UVBLANK is logic low, the first multiplexer 91 outputs the signal HEN_IN to the write counter 92, and the write counter 92 counts up in accordance with the clock signal CK, only in an interval in which the signal HEN_IN is logic high. Meanwhile, if the signal UVBLANK is logic high, the first multiplexer 91 outputs the signal WREN to the write counter 92, and the write counter 92 counts up in accordance with the clock signal CK, only in an interval in which the signal WREN is logic high. The outputs of the write counter 92 and the second multiplexer 93 are added by the adder 94, and the output of the adder 94 is output at FIFO_WR_ADR to the memory unit 46 (FIG. 4) as a write address.

Figure 10:
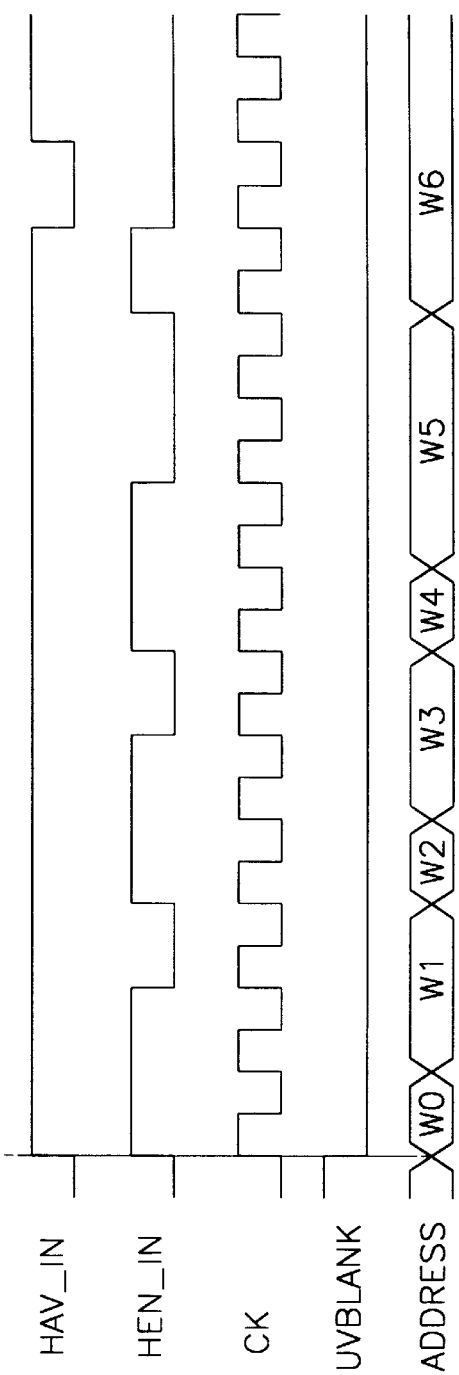
FIGS. 10 and 11 are timing diagrams of generation of write addresses in normal and vertical blanking interval (VBI) modes, respectively.
Figure 11:
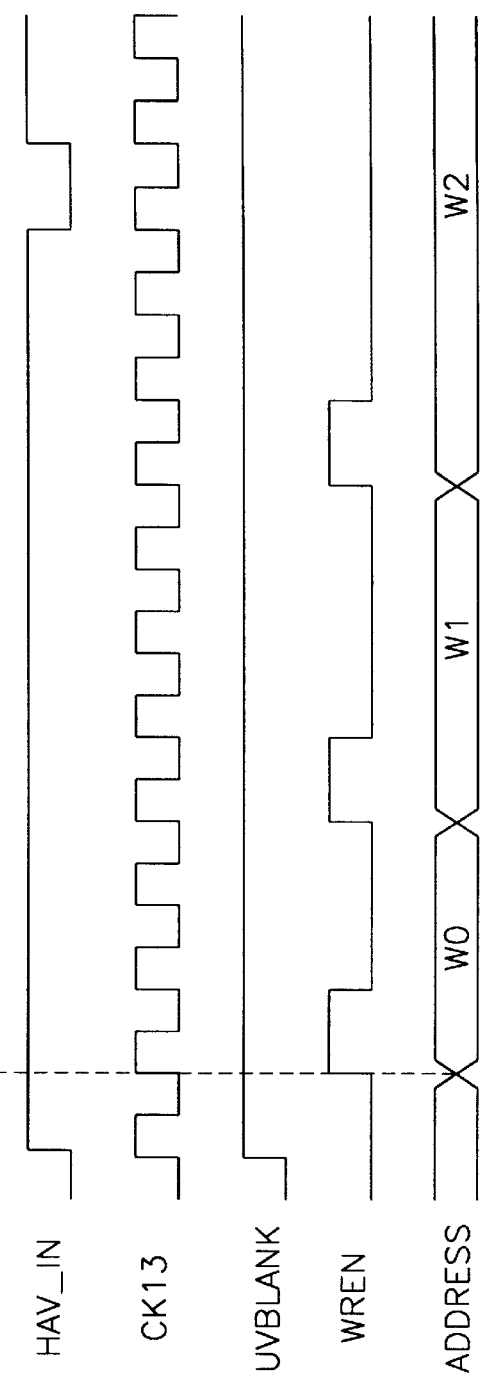

FIGS. 10 and 11 are timing diagrams of generation of the write address in a normal mode and a VBI mode, respectively.

In FIG. 10, when the signal UVBLANK is logic low (normal mode) and also the signals HAV_IN and HEN_IN are logic high, addresses W0, W1, W2, . . . for writing an active video signal to the memory are sequentially generated, in accordance with the trigger of the clock signal CK. Here, the active video data to be written in accordance with the address is Y0 and U0 in W0, Y1 and V0 in W1, Y2 and U2 in W2, and Y2 and V2 in W3, etc.

In FIG. 11, when the signal UVBLANK is logic high (VBI mode) and also the signals HAV_IN and WREN are logic high, addresses W0, W1, W2, . . . are generated for writing vertical blanking signals to the memory unit 46, in accordance with the trigger of the clock signal CK. Here, the vertical blanking data written in accordance with each address is VB0 in W0, VB1 in W1 and VB2 in W2, etc.

Figure 12:
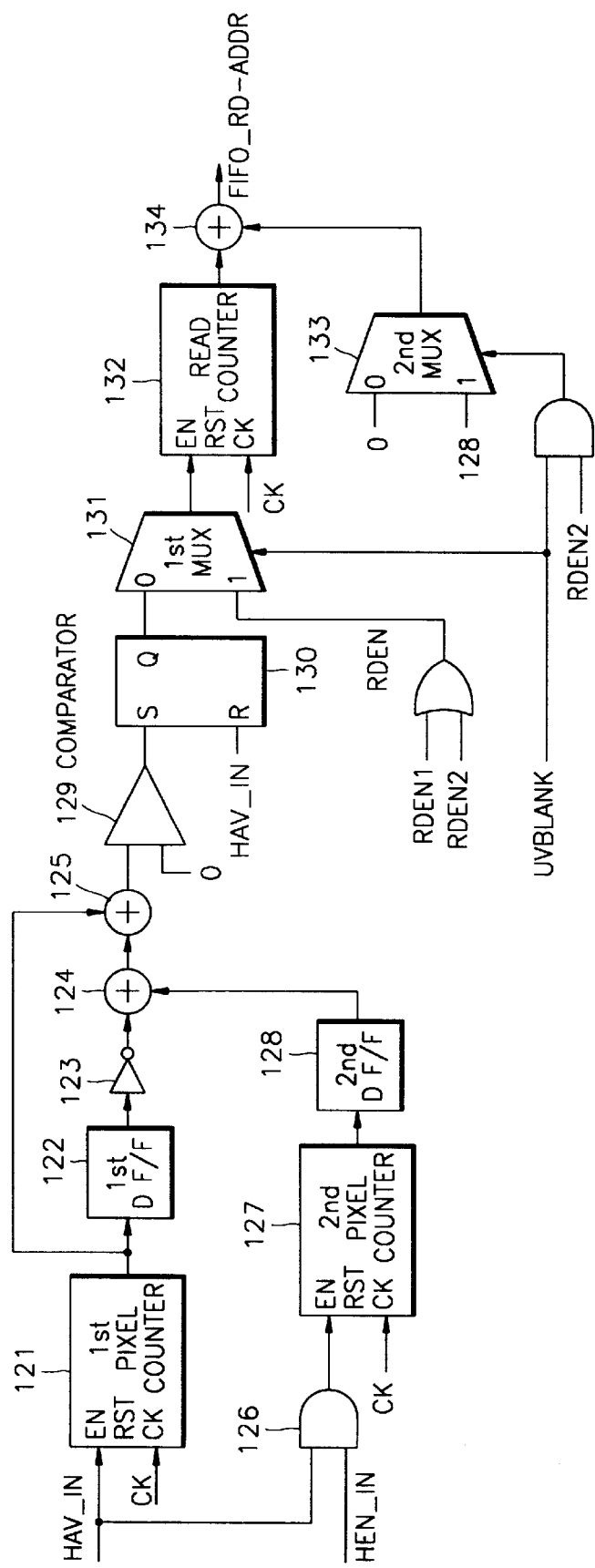
FIG. 12 is a block diagram of a read address generator.

Referring to FIG. 12, a read address generator, a first pixel counter 121 receives the signal HAV_IN, counts in accordance with the trigger of the clock signal, to count the number of pixels of data input in the active video interval, and resets the counted value at a rising edge of the signal HAV_IN. Here, an output of the first pixel counter 121 becomes the number of a currently received pixel. The first D-flipflop 122 stores the output of the first pixel counter 121, to store the total number of pixels received during one active signal interval.

The AND gate 126 performs an AND operation on the signal HAV_IN and the signal HEN_IN, and the second pixel counter 127 receives the AND result and counts up while the AND result is logic high, i.e., the signals HAV_IN and HEN_IN are both logic high, in accordance with the trigger of the clock signal CK, and resets the count value at the rising edge of the signal HAV_IN. Here, an output value of the second pixel counter 127 becomes the number of pixels of effective data scaled by a predetermined ratio. The second D-flipflop 128 stores the output value of the second pixel counter 127, which represents the total number of effective pixels during one active signal interval.

An inverter 123 inverts the total number of pixels stored in the first D-flipflop 122 to output the inverted number, and the first adder 124 adds the inverted total number of pixels to the total number of effective pixels output from the second D-flipflop 128. The second adder 125 adds the current pixel number output from the first pixel counter 121 to an output of the first adder 124, and outputs the sum. The comparator 129 compares the output of the second adder 125 to a fixed value zero. The comparator 129 outputs a logic high if the output of the second adder 125 is greater than zero, and logic low if not. A register 130, preferably a set-reset type register, receives the output of the comparator 129 at a set (S) input terminal and the signal HAV_IN at a reset (R) input terminal, to output logic high when the output of the comparator 129 is logic high, and is reset at the falling edge of the signal HAV_IN. The moment at which the output of the set-reset register 130 changes from logic low to logic high is the point in time at which the scaled data begins to be read from the memory.

The first multiplexer 131 receives the output of the set-reset register 130 and a RDEN signal, and selects one signal in accordance with the signal UVBLANK. That is, when the signal UVBLANK is logic low (normal mode), the first multiplexer 131 selects the output signal of the set-reset register 130, and when UVBLANK is logic high (VBI mode), the signal RDEN is selected. Here, the signal RDEN is a signal obtained by performing an OR operation on the first read enable signal RDEN1 and the second read enable signal RDEN2. The signal RDEN is logic high when the first read enable signal RDEN1 or the second read enable signal RDEN2 is logic high.

A read counter 132 receives the output of the first multiplexer 131 to count it in accordance with the trigger of the clock signal, and resets the count value at the rising edge of the signal HAV_IN. Here, the output of the read counter 132 becomes the number of effective pixels of scaled data in the normal mode, and the number of pixels of VBI data received during the vertical blanking interval in the VBI mode. The second multiplexer 133 selects 0 or 128 in accordance with the signals UVBLANK and RDEN2. That is, if the signal UVBLANK is logic low (normal mode), 0 is selected, and if the signals UVBLANK and RDEN2 are both logic high (VBI mode), 128 is selected. Thus, if the signal RDEN2 is logic high, the normal mode data and the VBI mode data can be normally read from the memory at a predetermined offset (128).

A third adder 134 adds the count value of the read counter 132 to the output of the second multiplexer 133, to generate a read address FIFO_RD_ADDR. That is, the third adder 134 outputs as a read address, at FIFO_RD_ADDR the count value of the read counter 132 in a normal mode, and the sum of a predetermined offset value and the count value of the read counter 132 in a VBI mode.

By the above-described read control method, the effective data obtained by scaling data of a horizontal video line in accordance with a predetermined scaling ratio are moved to the right portion of the screen to be output. If, for example, the horizontal scaling ratio is ½, the total number of active video signal pixels is 720 in a CCIR601 NTSC format, so that the number of active pixels after horizontal scaling becomes 360. When data corresponding to the left portion of the active video line which is divided into two is scaled, the number of scaled effective pixels becomes 180. The video data of the preceding portion of the current video line which is being scaled is first written to the FIFO memory. The FIFO memory data may begin to be read from a point of half of the active video line. In the CCIR601 NTSC format, the timing point of reading data from the FIFO would be 720-720*X, where X indicates a scaling ratio, i.e., the time when the number of pixel data obtained by subtracting the number of effective pixels from the total number of pixels is the same, and thus the read time point becomes 360 when the scaling ratio is ½.

The above-described method of determining a read point is realized by the read address generator of FIG. 12.

The first pixel counter 121 counts up in accordance with the clock signal CK while the signal HAV_IN is logic high, to output a current pixel number, and stores the count value at the falling edge of the signal HAV_IN in the first D-flipflop 122. The value becomes the total number of pixels in one active video signal interval, and the value is inverted by the inverter 123 and then input to the first adder 124. Also, a current pixel number which is an output of the first pixel counter 121 is received into the second adder 125.

Meanwhile, the signals HAV_IN and HEN_IN are received by the AND gate 126, and the output signal of the AND gate is received by an EN terminal of the second pixel counter 127. The second pixel counter 127 counts up in accordance with the clock signal CK while the signals HAV_IN and HEN_IN are all logic high, to output the number of scaled effective pixels, and stores the count value at the falling edge of the signal HAV_IN in the second D-flipflop 128. The output of the second D-flipflop 128 is received by the first adder 124 and added to the inverted total number of pixels in one active signal interval, and the output of the first adder 124 is received by the second adder 125 and added to the current pixel number. If the output of the second adder 125 is greater than 0, the comparator 129 outputs a signal of logic high to the set-reset register 130, and the logic high signal is received by the read counter 132 through the first multiplexer 131. The point in time when the logic high signal is output through the first multiplexer 131 is the point in time of beginning to read active video data from the FIFO memory. The output of the read counter 132 is output to the third adder 134, and the third adder 134 adds the output of the read counter 132 to the output of the second multiplexer 133, to generate a read address FIFO_RD_ADDR.

An example of generating a read address for the FIFO memory will be described as follows. If the scaling ratio is ¼, the number of active pixels before the start of a current video line is 720, and the number of effective pixels is 180, the first D-flipflop 122 stores 720 at the falling edge of the signal HAV_IN, and the second D-flipflop 128 stores 180 (i.e., 720/4) at the falling edge of the signal HAV_IN. Thus, the output of the first adder 124 becomes −540 in accordance with the output of the first and second D-flipflops 122 and 128. If active pixel data of a current video line is input and thus the count value of the first pixel counter 121 becomes 541, i.e., if the 541th active pixel data is received, the output of the second adder 125 is greater than 0. Thus, the output of the comparator 129 sets the set-reset register 130. The set-reset register 130 outputs logic high, and a read address is generated by the first multiplexer 131 and the read counter 132.

Figure 13:
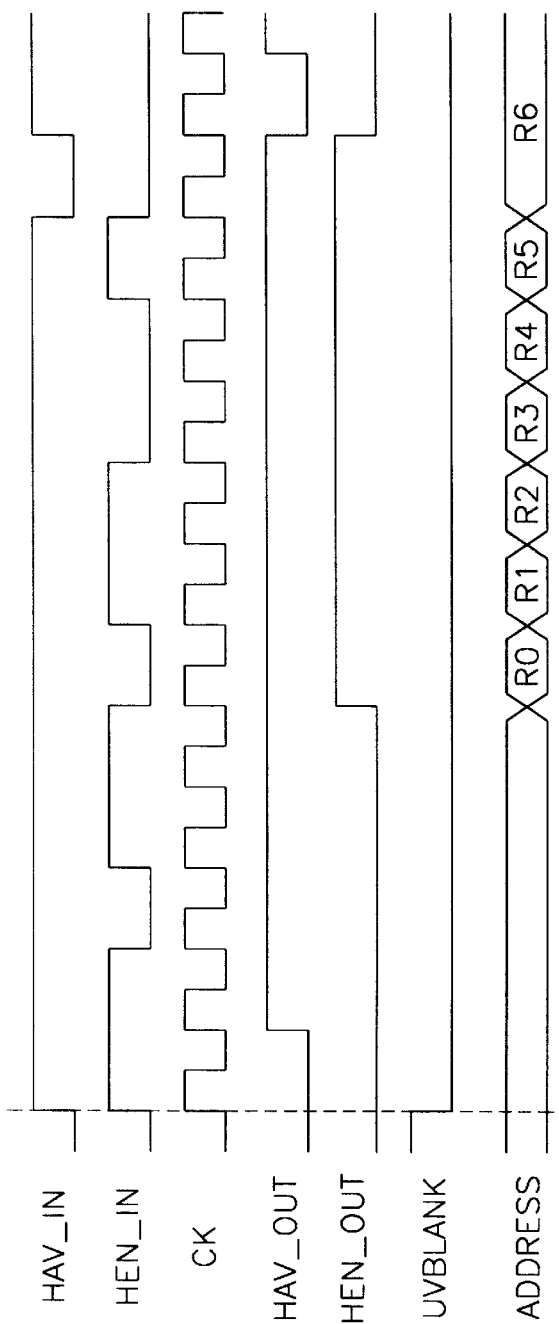
FIGS. 13 and 14 are timing diagrams of generation of read addresses in normal and VBI modes, respectively.

In FIG. 13, when the signal HAV_OUT is logic high and the signal UVBLANK is logic low (normal mode), a read beginning point occurs at which the signal HEN_OUT is changed to logic high, to thereby sequentially generate addresses R0, R1, R2, . . . , from the above time point, for reading the scaled video signal from the memory according to the trigger of the clock CK. Here, the active video data read in accordance with each address is Y0 and U0 in R0, Y1 and V0 in R1, Y2 and U2 in R2 and Y2 and V2 in R3, etc.

Figure 14:
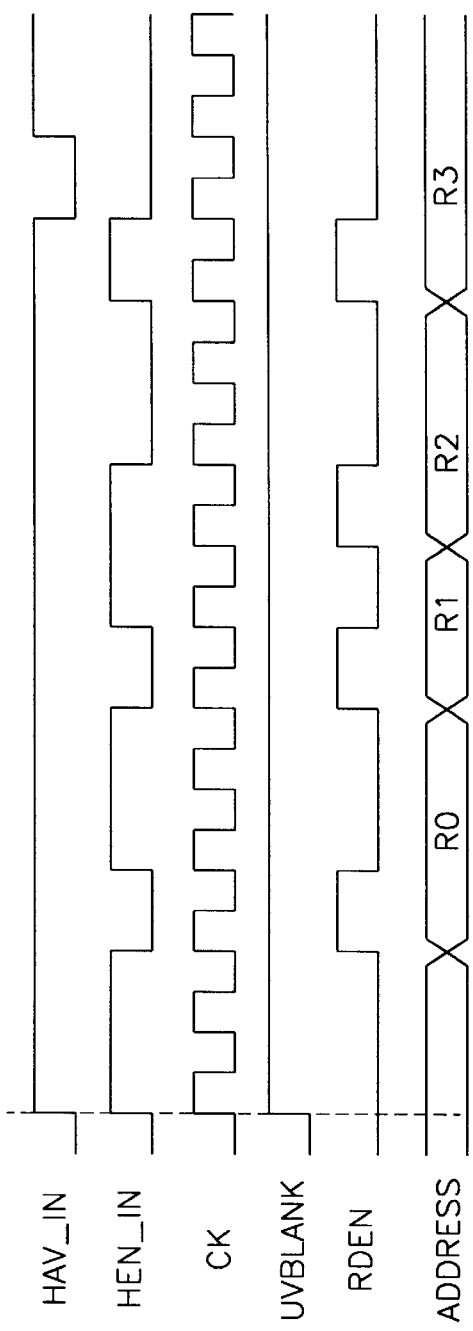

In FIG. 14, when signals HAV_IN and RDEN are logic high and the signal UVBLANK is logic high (VBI mode), addresses R0, R1, R2, . . . for reading a vertical blanking signal from the memory are sequentially generated according to the trigger of the clock CK. Here, the vertical blanking data read in accordance with addresses are VB0 in R0, VB1 in R1 and VB2 in R2, etc.

Figure 15:
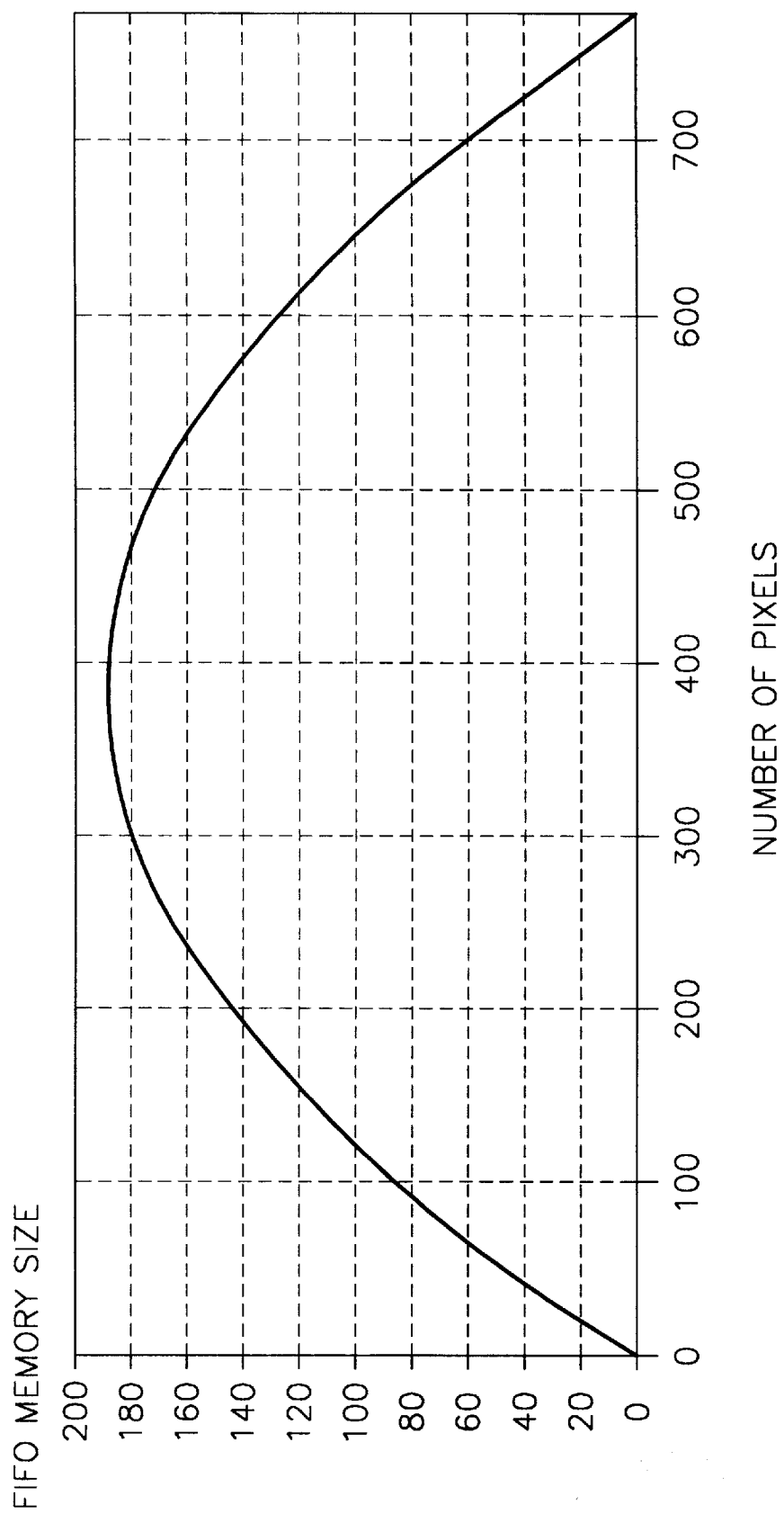
FIG. 15 is a plot of a memory size versus number of pixels of scaled video data.

In FIG. 15, the horizontal axis indicates the number of pixels of scaled active video data, and the vertical axis indicates a required FIFO memory size. The graph shaped like a bell represents the relationship between the number of scaled pixels and the memory size when the scaling ratio is ½.

In order to process VBI data as well as active video data using the scaler memory, the memory size required is larger than one required for the scaled active data and another required for processing the VBI data. Since the size of the typically used scaler memory is larger than that required for processing the scaled data, the VBI data can also be processed using the spare scaler memory space.

Advantageously, according to the illustrative scaler memory controller of the present invention and the method of using the same, in a video signal processor including a scaler and a VBI decoder, active video data is processed in an active interval, and vertical blanking data is processed in the VBI, by using the FIFO memory in the scaler. Thus, no additional external terminal for processing the VBI data is required, and the VBI data can be more efficiently and rapidly processed.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

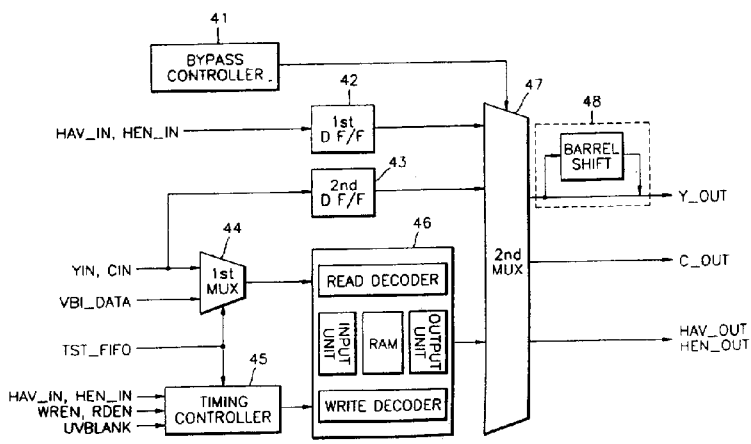

What is claimed is:

1. A video signal processing system having a scaler memory for receiving active video data to output data scaled by a predetermined ratio through the scaler memory, and a VBI decoder for processing VBI data received during a vertical blanking interval (VBI), comprising:

means for scaling the active video data by a predetermined ratio;

means for time division multiplexing the scaled video data and the VBI data and for writing the multiplexed data into the scaler memory; and means for reading scaled active data from the memory during the active video interval, reading the VBI data from the memory during the VBI, and outputting the read data when the memory output is enabled.

2. The system according to claim 1, wherein said scaler memory is a FIFO memory.

3. The system according to claim 1, wherein said means for time division multiplexing includes means for writing multiplexed scaled video data into the scaler memory during an active video interval and writing multiplexed VBI data during VBI.

4. The system according to claim 1, wherein said means for scaling includes: counter means for counting a number of pixels of video data in an active video data interval and a number of pixels of a given scaled version of said video data.

5. The system according to claim 4, wherein said means for scaling further includes a comparator for comparing numbers of pixels of said video data and said scaled video data and upon reaching said given scaled ratio number of pixels, reading said scaled video data stored in said scaler memory.

6. The system according to claim 1, wherein said means for time division multiplexing comprises a multiplexor.

7. A method for controlling a video signal processing system including a scaler having a memory for receiving active video data to output data scaled by a predetermined ratio through the memory, and a VBI decoder for processing VBI data received during a vertical blanking interval (VBI), comprising the steps of:

generating a mode select signal for selecting one of a normal mode for reading or writing the active video data from or to the memory, and a VBI mode for reading or writing the VBI data from or to the memory;

generating a control signal for enabling data to be read or written from or to the memory in each of the modes;

multiplexing by a multiplexer the active video data and the VBI data in accordance with the mode select signal;

receiving the signal output from the multiplexer and scaling the active video data by a predetermined ratio during an active video interval to write the scaled active video data to the memory when the memory is write enabled, and writing the VBI data to the memory during a vertical blanking interval (VBI); and reading scaled active video data from the memory during the active video interval, reading the VBI data from the memory during the VBI, and outputting the read data if the memory is output enabled.

8. The method according to claim 7 wherein said reading and writing of said scaled video data and VBI data to and from said scaler memory is by first-in first-out format.

9. The system according to claim 7, further comprising the steps of:

counting a number of pixels of the active video data in the active video data interval and a number of pixels of the scaled active video data; and comparing the number of the pixels of the active video data in the active video data interval and the number of the pixels of the scaled active video data to determine a timing point at which to read the scaled active video data from the memory during said reading step.

10. A scaler memory controller of a video signal processing system including a scaler having a memory for receiving active video data to output data scaled by a predetermined ratio through the memory, and a VBI decoder for processing VBI data received during a vertical blanking interval (VBI), comprising:

mode setting means for setting one of a normal mode and a VBI mode, for reading or writing active video data and VBI data, respectively, from or to the memory;

a write address generator for generating an address for scaling the active video data during an active video interval by a predetermined ratio to sequentially write the scaled data to the memory, or an address for sequentially writing the VBI data during the VBI to the memory, in accordance with set mode; and a read address generator generating an address for reading the scaled data during the active video interval, or the VBI data during the VBI, from the memory, in accordance with the set mode.

11. The memory controller according to claim 10 wherein said memory is a FIFO memory.

12. The memory controller according to claim 10, further comprising:

means for counting a number of pixels of the active video data during the active video interval and a number of pixels of the scaled data; and means for comparing the number of the pixels of the active video data during the active video interval and the number of the pixels of the scaled data to determine a timing point at which to read the scaled data from the memory.

13. A method for controlling a scaler memory of a video signal processing system including a scaler having a memory for receiving active video data to output data scaled by a predetermined ratio through the memory, and a VBI decoder for processing the VBI data received during a vertical blanking interval (VBI), for processing the active video data and the VBI data through the memory of the scaler, comprising the steps of:

during an active video signal interval, scaling the active video data by a predetermined ratio to write the scaled data in the memory;

comparing the total number of pixels with the number of effective pixels during the write process to determine a timing point of beginning to read data;

reading data at the determined read timing point from the memory; and during the VBI, reading VBI data written during a previous VBI from the memory and writing VBI data to be read during a next VBI to the memory.

14. The method according to claim 13, wherein said reading and writing of said scaled video data and VBI data to and from said scaler memory is by first-in first-out format.

* * * * *

UNITED STATES PATENT AND TRADEMARK OFFICE
CERTIFICATE OF CORRECTION

PATENT NO.     : 6,266,095 B1
DATED          : July 24, 2001
INVENTOR(S)    : Jun Sunwoo It is certified that error appears in the above-identified patent and that said Letters Patent is hereby corrected as shown below:

Title page should be deleted and substitute therefore the attached title page.

Signed and Sealed this

Eighth Day of April, 2003

JAMES E. ROGAN
*Director of the United States Patent and Trademark Office*

United States Patent
Sunwoo

(10) Patent No.: US 6,266,095 B1
(45) Date of Patent: Jul. 24, 2001

(54) APPARATUS AND METHOD FOR CONTROLLING SCALER MEMORY OF VIDEO SIGNAL PROCESSING SYSTEM

(75) Inventor: Jun Sunwoo, Seoul (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/181,132

(22) Filed: Oct. 28, 1998

(30) Foreign Application Priority Data

Nov. 11, 1997 (KR) .................................. 97-59283

(51) Int. Cl.⁷ ........................................ H04N 7/08
(52) U.S. Cl. .............. 348/473; 348/476; 348/478; 348/581; 348/556
(58) Field of Search ..................... 348/473, 476, 348/477, 478, 479, 464, 467, 468, 581, 568, 445, 556, 520, 408.1; 375/317, 318

(56) References Cited

U.S. PATENT DOCUMENTS

| | | | |
|---|---|---|---|
| 4,709,394 | * 11/1987 | Bessler et al. | 348/408.1 |
| 5,225,875 | * 7/1993 | Shapiro et al. | 348/571 |
| 5,638,467 | * 6/1997 | Chua et al. | 348/441 |
| 5,786,866 | * 7/1998 | Sani et al. | 348/520 |
| 5,907,366 | * 5/1999 | Farmer et al. | 348/478 |
| 6,118,828 | * 9/2000 | Schleifer | 375/317 |

* cited by examiner

Primary Examiner—Reinhard J. Eisenzopf
Assistant Examiner—Trang U. Tran
(74) Attorney, Agent, or Firm—F. Chau & Associates LLP

(57) ABSTRACT

A video signal processing system including a scaler and a VBI decoder is provided. The video signal processing system includes a control signal generator for generating a mode select signal for selecting one of a normal mode for reading or writing the active video data from or to the memory, and a VBI mode for reading or writing the VBI data from or to the memory. A control signal is also generated for enabling data to be read or written from or to the memory in each of the modes. A multiplexer multiplexes active video data and VBI data in accordance with the mode select signal. There is also provided write control means for receiving the signal output from the multiplexer, and if the memory write is enabled by the control signal generator, for scaling the active video data by a predetermined ratio during an active video interval to write the scaled active video data to the memory, or writing the VBI data to the memory during a vertical blanking interval (VBI), and read control means for reading scaled active video data from the memory by a FIFO method during the active video interval, or reading the VBI data from the memory by a FIFO method during the VBI, and outputting the read data, if the memory read is enabled by the control signal generator. Thus, active video data and vertical blanking data can be processed in an active interval and a vertical blanking interval, respectively, by a time-division method using the scaler memory.

14 Claims, 10 Drawing Sheets